Oct. 2, 1951

R. O. HANSON 2,569,930

LISTENING AMPLIFIER

Filed Dec. 28, 1945

Inventor

RUSSELL O. HANSON

By M. C. Hayes

Attorney

Patented Oct. 2, 1951

2,569,930

UNITED STATES PATENT OFFICE 2,569,930

LISTENING AMPLIFIER

Russell O. Hanson, New London, Conn., assignor to the United States of America as represented by the Secretary of the Navy Application December 28, 1945, Serial No. 637,742

1 Claim. (Cl. 177—386)

This invention relates in general to audio amplifiers and more particularly to audio amplifiers used with listening gear for submarines and surface craft.

In general, the amplifier of this invention is operated with a signal from a magnetostriction hydrophone, and the amplifier output is applied to a pair of headphones. The hydrophone is mounted to be oriented through an angle of 360° by remote means which are indicative of the direction of the hydrophone. When used with a baffle the hydrophone has very directional characteristics. Hence, the operator may turn the hydrophone to a point where the signal is a maximum in the headphones, and the resulting bearing of the hydrophone will be the bearing of the source of signals.

If the listening gear is mounted on a surface ship, it may be used for the detection of submarines, either submerged or afloat, or the approach of other surface ships at night or in a fog. The listening gear is usually mounted on submarines for the same purpose, and it becomes a very important piece of apparatus when the submarine is submerged, serving more or less as the eyes of the submarine.

Various problems arise in the development of the apparatus of this invention, for instance, certain underwater noises are known to have certain frequencies, and for this reason a multi-band filter is required in the amplifier.

In certain cases where the maximum signal output is critical, such as in bearing determination, an electron-ray indicator is included in the amplifier circuit.

This invention consists in providing an amplifier capable of producing optimum operation of standard listening gear apparatus. Accordingly, an object of this invention is to provide an amplifier capable of receiving underwater signals from a hydrophone, amplifying and treating said signals until they become intelligible to the operator.

Another object is to provide an amplifier that indicates the signal audibly by headphone and visually by an electron-ray indicating device.

Another object is to provide an amplifier capable of selecting certain frequency bands for amplification and treatment.

Another object is the provision of an amplifier system which will be economical to manufacture, reliable in operation and which possesses all of the qualities of ruggedness and dependability in service.

Figures 1, 2, 3:
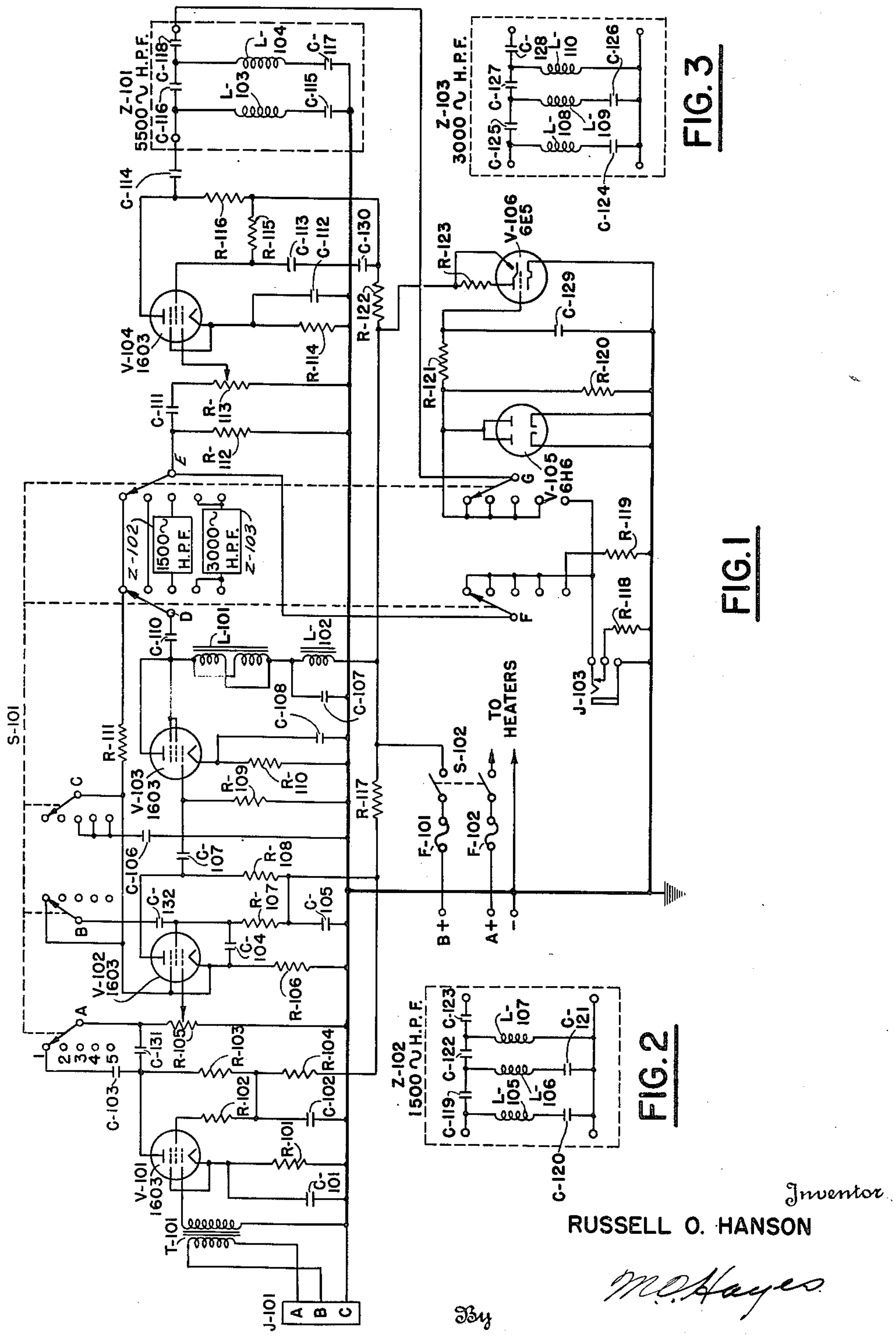
Figure 1 is a detail circuit diagram of the amplifier circuit of this invention.
Figure 2 is a circuit diagram of the 1500 cycle high pass filter of the amplifier.
Figure 3 is a circuit diagram of the 3000 cycle high pass filter of the amplifier.

The circuit of Figure 1 is a battery powered amplifier for use with a directional hydrophone. Jack J–101 is plugged into the terminals leading to the hydrophone. The output from the hydrophone passes through transformer T–101 on the way to the first amplifier tube V–101. The circuit incorporates a filter section for selecting different frequency bands in underwater sonic listening and an electron-ray indicator tube to aid in training the hydrophone. The circuit is designed for headphone use.

In listening to noises produced by ships and transmitted to the listener through the water, it is frequently desirable to listen to various sections of the sound spectrum as an aid to identification of the sound source and possible determination of its speed. The present amplifier incorporates a set of filters which permit selection of frequency bands having the following characteristics, (1) flat, (2) 500 cycle high pass, (3) 1500 cycle high pass, (4) 3000 cycle high pass, (5) 5500 cycle high pass. It also has an electron-ray indicator tube operating on high frequency signals to aid the operator in accurate training of the directional hydrophone used with the amplifier.

In this circuit, the filters are selected by a seven pole, five position switch S–101. When the switch S–101 is in any of the positions 1 to 4, the signal passes through a three-stage amplifier made up of tubes V–101, V–102, and V–103 to the operator's headset jack J–103, and through tube V–104, the 5500 cycle-per-second high-pass filter Z–101, and the diode V–105 to the electron-ray tube V–106. The electron-ray indicator tube V–106 is therefore actuated by the high-frequency portion of the sound spectrum which possesses sharper directional characteristics than the low-frequency portion.

In the first two positions of switch S–101, the frequency characteristics of the three-stage amplifier are changed by internal changes in connections as here-in-after explained. In position 3, a 1500 cycle-per-second high-pass filter Z–102 is inserted in the output of tube V–103, and in position 4, a 3000 cycle-per-second high-pass filter is inserted in the output of tube V–103 to further reduce the band of frequencies impressed on the operator's headset. Since the intensity of the sound level applied to the operator's headset is reduced as the band of frequencies passed by the amplifier to the operator's headset is reduced, provision is also made to compensate the amplification of the signal in the several switch positions to provide an approximately constant sound level.

Referring to Fig. 1 in detail, the hydrophone is connected to the input jack J-101 and its output is matched to the input of tube V-101 by the transformer T-101. Tube V-101 is a pentode amplifier operating in class A and biased by the cathode resistor R-101 by-passed by the capacitance C-102. The plate resistance R-103 is coupled to V-102 through capacitance C-131 of low capacity so as to provide in combination with the gain control R-105 a high-pass filter of about 500 cycles-per-second. Section A of switch 101 is arranged in position 1 thereof to connect capacitance 103 in parallel with capacitance C-131 to increase the low frequency response of the amplifier in the "flat" characteristic position.

Tube V-102 is also a pentode amplifier operating in class A and biased by the cathode resistance R-106. The screen grid of tube V-102 is by-passed to the cathode by capacitance C-104 having a low capacity which permits the screen grid voltage to change with the signal at low frequencies, so that the amplification of low frequencies is greatly reduced. Furthermore, the cathode resistance R-106 is not by-passed, so that a portion of the output of the tube is introduced in degenerative fashion to the input circuit of the tube. Section B of switch S-101 connects capacitance C-132 in parallel with the screen grid by-pass capacitance C-104 in position 1 to increase the low frequency response in that position, and section C of switch S-101 connects the cathode by-pass capacitance C-106 in shunt with the cathode resistance 106 in positions 3, 4, and 5 to increase the amplification of tube V-102 in these positions.

Tube V-103 is a pentode tube connected as a triode amplifier coupled to the plate resistor of tube V-102 by coupling capacitance C-107, and provided with a conventional cathode resistance R-109 and by-pass capacitor C-108. The anode of tube V-103 is energized through a plate impedance L-101 which further reduces the low frequency response of the amplifier. Sections D and E of switch S-101 jointly control the output of tube V-103, section D being coupled to the plate impedance L-101 through the coupling capacitance C-110 and section E being connected to the remainder of the circuit later to be described.

In position 1 of switch S-101, sections D and E are connected together and to the feed-back resistance R-111 which applies a part of the output of tube V-103 to the cathode of tube V-102 to provide degenerative feed-back correcting the frequency characteristic of the amplifier in the flat position. In position 2, sections D and E are connected together, but the feed-back resistance R-111 is disconnected from the output of tube V-103, since correction of the low frequency response is desired only in position 1. In position 3, the 1500 cycles-per-second high-pass filter Z-101 is connected between sections D and E, and in positions 4 and 5, the 3000 cycles-per-second high-pass filter Z-103 is connected between section D and E.

Section F of switch S-101 is connected to section E, the operator's headset jack J-103 being connected to positions 1, 2, 3, and 4 of section F. In position 5, resistance R-119 is connected to section F of switch S-101 since the operator's headset is energized from another circuit in this position.

The resistance R-112 aids in preventing interaction between the operator's headset circuit and the amplifier stage now to be described. Tube V-104 is coupled to the resistance R-112 through the capacitance C-111 and the gain control R-113, and is a conventional pentode voltage amplifier employing a cathode resistance R-114 cathode by-pass condenser C-112 and plate resistor R-116. The output of tube V-104 is coupled through capacitance C-114 to the 5500 cycles-per-second high-pass filter Z-101, the output of the filter Z-101 being connected to section G of switch S-101.

Positions 1, 2, 3, and 4 of section G of switch 101 are connected to the diode V-105 which conducts positive half-cycles to ground so as to apply a direct current voltage to condenser C-129 through the charging resistor R-121, resistance R-120 providing a discharge leakage path for the condenser. The voltage produced on the condenser C-129 controls the operation of the electron ray indicator tube V-106. The tube 106 is of the "magic eye" type used on ordinary broadcast receivers and operates as a level indicator on high frequency sound energy.

Position 5 of section G is connected to the operator's headset jack J-103 to provide a high frequency audible signal, the electron ray indicator tube being disconnected from the circuit.

Tube V-101 is decoupled from the plate power supply by resistance R-104 and condenser C-102, while V-102 is decoupled by resistance R-117 and condenser C-105. Tube V-103 is decoupled by means of inductance L-102 and condenser C-107, while tube V-104 is decoupled by resistance R-122 and C-130. R-102, R-107, and R-115 are screen dropping resistances for tubes V-101, V-102, and V-104 respectively, and C-113 is the screen bypass condenser for the tube V-104.

Power is supplied to the amplifier through fuses F-101 and F-102 and switch S-102, the negative sides of both plate and heater supplies being grounded. The operator's headset jack J-103 is a closed-circuit jack, removal of the headset plug closing the headset circuit through the resistance R-118.

The circuit diagrams of the 1500 cycles per second high-pass filter Z-102 is shown in Fig. 2, while the 3000 cycles per second high-pass filter is shown in Fig. 3. The construction of these filters is conventional, and well-known to those skilled in the art.

It will be apparent to those skilled in the art that in position 1 of switch S-101, the amplifier will conduct nearly the entire audible frequency range, but that the amplification will be reduced by the degeneration produced by resistor R-111 and the unby-passed cathode resistor R-106. However, in position 2, the amplification is increased by disconnecting R-111 and the band width is reduced to a 500-cycles-per-second high-pass characteristic at the same time by disconnecting C-103 and C-132 from tubes V-101 and V-102 respectively. In position 3, the 1500 cycles-per-second high-pass filter is inserted and the cathode resistance R-106 is by-passed to increase the gain of the amplifier, and in position 4, the 3000-cycles-per-second filter is inserted. In position 5, the band of frequencies is reduced to a 5500-cycles-per-second high-pass characteristic but the additional stage of amplification is also inserted in the circuit. By this method, the sound level on each position of switch S-101 is maintained approximately constant.

It will also be realized that the operator is able to accurately direct his hydrophone by means of the electron ray indicator tube V-106, even though he is listening through the amplifier in the low frequency range having broad directional characteristics. The operator may also analyse any sounds heard for the approximate frequency content and may thereby judge the speed and character of its source.

What is claimed is:

In apparatus for determining the direction and predominant frequencies of a source of audible underwater sound adapted for use with a single rotatable hydrophone having a highly directional characteristic at high audible frequencies and less directional characteristics at lower audible frequencies, a first amplifier having its input connected to said hydrophone, a second amplifier having its input connected to the output of said first amplifier, a first high-pass filter having a cut-off frequency at a high audible frequency connected to the output of said second amplifier, an electron ray indicating tube, a headset, a plurality of second high-pass filters each having a different cut-off frequency in the audible frequency range below the cut-off frequency of said first high-pass filters, a first multi-position switch means for selectively connecting the inputs of said second high-pass filters to the output of said first amplifier and the outputs of said second high-pass filters to said headset, a second multi-position switch means for connecting said electron ray indicating tube to the output of said first high-pass filter when any of the outputs of said second high-pass filters are connected to said headset, and for connecting the output of said first high-pass filter to said headset when said second high-pass filters are disconnected from said headset, said first and second multi-position switch being mechanically ganged for simultaneous operation, whereby the operator is enabled to accurately locate a source of sound by the high audible frequency sound energy while simultaneously estimating the sound energy in the lower audible frequency ranges determined by said second high-pass filters.

RUSSELL O. HANSON.

REFERENCES CITED

The following references are of record in the file of this patent:

UNITED STATES PATENTS

| Number | Name | Date |
|---|---|---|
| 1,349,305 | Walker | Aug. 10, 1920 |
| 1,730,411 | Dorsey | Oct. 8, 1929 |
| 2,040,850 | Hubbard | May 19, 1936 |
| 2,166,991 | Guanalla | July 25, 1939 |
| 2,297,668 | Batchelder | Sept. 29, 1942 |
| 2,433,991 | Hebb | Jan. 6, 1948 |

FOREIGN PATENTS

| Number | Country | Date |
|---|---|---|
| 578,020 | Germany | June 8, 1933 |